(12) United States Patent
Arora et al.

(10) Patent No.: US 10,089,382 B2
(45) Date of Patent: Oct. 2, 2018

(54) TRANSFORMING A KNOWLEDGE BASE INTO A MACHINE READABLE FORMAT FOR AN AUTOMATED SYSTEM

(71) Applicant: Xerox Corporation, Norwalk, CT (US)

(72) Inventors: Akhil Arora, New Delhi (IN); Manoj Gupta, Bangalore (IN); Shourya Roy, Bangalore (IN)

(73) Assignee: Conduent Business Services, LLC, Dallas, TX (US)

( * ) Notice: Subject to any disclaimer, the term of this patent is extended or adjusted under 35 U.S.C. 154(b) by 315 days.

(21) Appl. No.: 14/887,096

(22) Filed: Oct. 19, 2015

(65) Prior Publication Data

US 2017/0109426 A1    Apr. 20, 2017

(51) Int. Cl.
   *G06F 17/30*    (2006.01)
(52) U.S. Cl.
   CPC .. *G06F 17/30598* (2013.01); *G06F 17/30011* (2013.01); *G06F 17/3053* (2013.01); *G06F 17/30327* (2013.01)
(58) Field of Classification Search
   None
   See application file for complete search history.

(56) References Cited

U.S. PATENT DOCUMENTS

| | | | | |
|---|---|---|---|---|
| 7,660,819 B1* | 2/2010 | Frieder | ............. | G06F 17/30687 707/999.107 |
| 7,779,002 B1* | 8/2010 | Gomes | ............. | G06F 17/30696 707/664 |
| 8,285,719 B1* | 10/2012 | Long | ................ | G06F 17/30598 707/737 |
| 2006/0095521 A1* | 5/2006 | Patinkin | ............... | G06Q 10/107 709/206 |
| 2007/0050708 A1* | 3/2007 | Gupta | ............... | G06F 17/30908 715/235 |
| 2007/0296750 A1* | 12/2007 | Heydinger | ........... | G06K 15/107 347/15 |
| 2008/0059512 A1* | 3/2008 | Roitblat | ............ | G06F 17/30705 |
| 2009/0024606 A1* | 1/2009 | Schilit | ................. | G06F 17/2211 |
| 2009/0043797 A1* | 2/2009 | Dorie | .................. | G06F 17/3071 |
| 2009/0157597 A1* | 6/2009 | Tiyyagura | ......... | G06F 17/30705 |
| 2009/0157607 A1* | 6/2009 | Tiyyagura | ......... | G06F 17/30705 |
| 2012/0166412 A1* | 6/2012 | Sengamedu | ...... | G06F 17/30867 707/709 |
| 2014/0297659 A1* | 10/2014 | Larsson | ............ | G06F 17/30722 707/750 |

* cited by examiner

*Primary Examiner* — Hung Le (57) ABSTRACT

A method, non-transitory computer readable medium and apparatus for transforming a knowledge base into a machine readable format for an automated system are disclosed. For example, the method includes clustering two or more documents of a plurality of documents in the knowledge base that are similar based upon a domain specific shingling function, identifying a pattern from each document of the plurality of documents that are clustered, wherein the pattern comprises a sequence of steps, aggregating the pattern of the each document of the plurality of documents that are clustered into a trie data-structure that is machine readable, receiving a request and applying the trie data-structure to provide a solution to the request.

20 Claims, 5 Drawing Sheets

TRANSFORMING A KNOWLEDGE BASE INTO A MACHINE READABLE FORMAT FOR AN AUTOMATED SYSTEM

The present disclosure relates generally to knowledge bases and, more particularly, to a method and apparatus for transforming knowledge bases into a machine readable format for an automated system.

BACKGROUND

Knowledge bases are a computer mediated information storage of heterogeneous types of data. These types of knowledge bases are typically unstructured and disorganized. Knowledge bases can be continuously updated without regard to duplication of data and may continue to grow to an unwieldy size.

Knowledge bases can be used for customer care. However, agents may manually search for solutions in the knowledge bases. In addition, agents may randomly hop from one article with a possible solution to another article without any order or structure. This leads to an inefficient application of the data that is collected in the knowledge bases.

SUMMARY

According to aspects illustrated herein, there are provided a method, non-transitory computer readable medium and apparatus for transforming a knowledge base into a machine readable format for an automated system. One disclosed feature of the embodiments is a method that clusters two or more documents of a plurality of documents in the knowledge base that are similar based upon a domain specific shingling function, identifies a pattern from each document of the plurality of documents that are clustered, wherein the pattern comprises a sequence of steps, aggregates the pattern of the each document of the plurality of documents that are clustered into a trie data-structure that is machine readable, receives a request and applies the trie data-structure to provide a solution to the request.

Another disclosed feature of the embodiments is a non-transitory computer-readable medium having stored thereon a plurality of instructions, the plurality of instructions including instructions which, when executed by a processor, cause the processor to perform operations that cluster two or more documents of a plurality of documents in the knowledge base that are similar based upon a domain specific shingling function, identify a pattern from each document of the plurality of documents that are clustered, wherein the pattern comprises a sequence of steps, aggregate the pattern of the each document of the plurality of documents that are clustered into a trie data-structure that is machine readable, receive a request and apply the trie data-structure to provide a solution to the request.

Another disclosed feature of the embodiments is an apparatus comprising a processor and a computer-readable medium. The computer readable medium comprises a clustering module to cluster two or more documents of a plurality of documents in the knowledge base that are similar based upon a domain specific shingling function, a pattern identification module to identify a pattern from each document of the plurality of documents that are clustered, wherein the pattern comprises a sequence of steps, an aggregation module to aggregate the pattern of the each document of the plurality of documents that are clustered into a trie data-structure that is machine readable and a customer interaction module to receive a request and apply the trie data-structure to provide a solution to the request.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for transforming a knowledge base into a machine readable format for an automated system. As discussed above, knowledge bases are a computer mediated information storage of heterogeneous types of data. These types of knowledge bases are typically unstructured and disorganized. Knowledge bases can be continuously updated without regard to duplication of data and may continue to grow to an unwieldy size.

Knowledge bases can be used for customer care. However, agents may manually search for solutions in the knowledge bases. In addition, agents may randomly hop from one article with a possible solution to another article without any order or structure. This leads to an inefficient application of the data that is collected in the knowledge bases.

Embodiments of the present disclosure provide a specialized server that can transform the unorganized, different types of documents into a machine readable data-structure that is then used to automatically provide a solution to a request. The specialized server may deploy unique methods that improve the overall computational efficiency of each step used to transform the documents into the machine readable data-structure.

Figure 1:
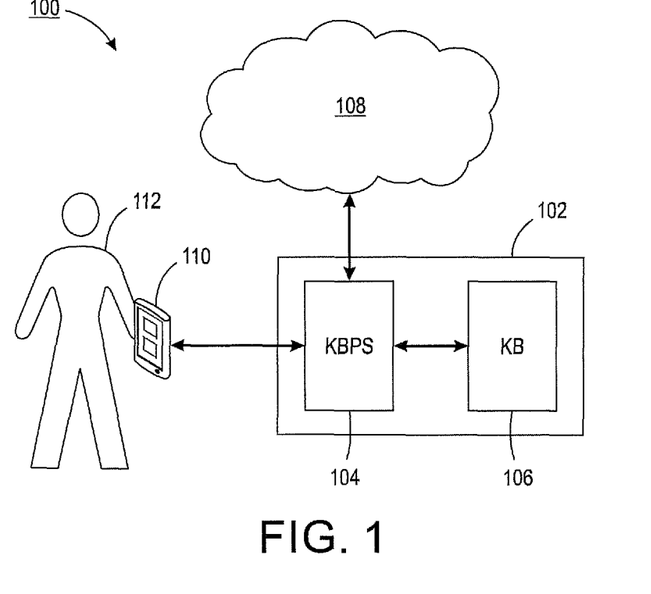
FIG. 1 illustrates an example block diagram of a communication network of the present disclosure.

FIG. 1 illustrates an example communication network 100 of the present disclosure. In one embodiment, the communication network 100 may include an enterprise location 102 (e.g., a customer care center) that includes a knowledge base processing server (KBPS) 104 and a knowledge base (KB) 106. The KB 106 may store a variety of different types of documents that are related to products and services of the enterprise location 102.

In one embodiment, the KBPS 104 may search the Internet 108 for documents related to the products and services of the enterprise location 102. Documents that are found may be stored in the KB 106. The KBPS 104 may periodically update the KB 106 with new documents (e.g., hourly, daily, weekly, monthly, and the like).

The KBPS 104 may automatically organize the documents in the KB 106 using the methods and functions described below and transform the KB 106 into a machine readable form for an automated system. It should be noted that although the KBPS 104 and the KB 106 are illustrated within a context of a customer care center of an enterprise location 102, that the KBPS 104 and the KB 106 may be associated with any type of automated system that requires an automated answer to a request.

In one embodiment, a customer 112 of the enterprise location 102 may have a problem with a product or service of the enterprise location 102. For example, the customer 112 may have a problem with a new smart phone or device that the customer 112 purchased. The customer 112 may call the enterprise location 102 with a customer care request to resolve the problem.

In one embodiment, the customer 112 may connect to the KBPS 104 via an endpoint device 110. The connection may be via a telephone call over a cellular connection, Voice over IP connection, and the like to submit the customer care request. In one embodiment, the KBPS 104 may use the machine readable data-structures that are created from the documents in the KB 106, as described in further detail below, to automatically provide a solution to the customer care request.

It should be noted that FIG. 1 has been simplified for ease of explanation. The network 100 may include additional network elements (e.g., routers, switches, firewalls, access points, gateways, and the like) or access networks not shown.

Figure 2:
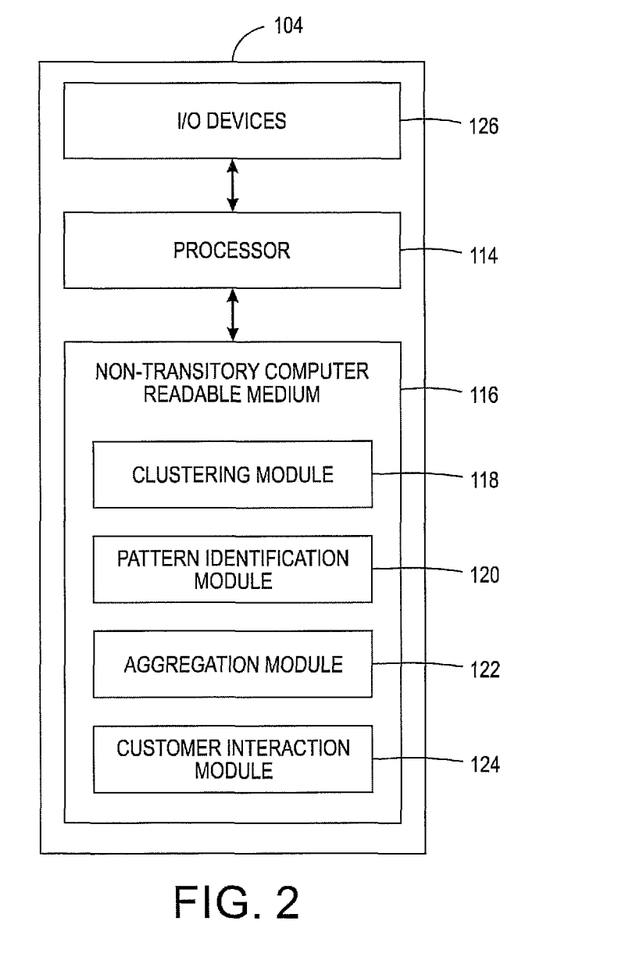
FIG. 2 illustrates a detailed block diagram of an example knowledge base processing server of the present disclosure.

FIG. 2 illustrates a more detailed block diagram of the KBPS 104. In one embodiment, the KBPS 104 may include a processor 114, a non-transitory computer readable medium 116 and various input/output devices 126. In one embodiment, the processor 114 may be in communication with the non-transitory computer readable memory 116 and the input/output devices 126. In one embodiment, the input/output devices 126 may include, for example, storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like).

In one embodiment, the processor 114 may include hardware processing elements (e.g., a central processing unit (CPU), a microprocessor, or a multi-core processor). Although only a single processor 114 is shown, it should be noted that the computer may employ a plurality of processor elements.

In one embodiment, the non-transitory computer readable medium 116 include, for example, random access memory (RAM) and/or read only memory (ROM). In one embodiment, the non-transitory computer readable medium 116 may include a clustering module 118, a pattern identification module 120, an aggregation module 122 and a customer integration module 124. In one embodiment, instructions associated with the modules 118, 120, 122 and 124 may be loaded into the non-transitory computer readable medium 116 and executed by the processor 114. In other words, the processor 114 may implement the steps, functions or operations as discussed below in connection with the exemplary method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

In one embodiment, the clustering module 118 may cluster similar documents using a domain based shingling. In one embodiment, each one of a plurality of documents in the KB 106 may be pre-processed to obtain metadata. The metadata may be hypertext markup language (HTML) tags that are contained or embedded in the documents. The metadata may be used to identify different domains in each document. For example, the domains may be different sections within the document (e.g., a title, a body of the article, an appendix, and the like).

After each domain is identified in the documents, the clustering module 118 may apply a shingling to each domain of each document. A shingle may be defined as a contiguous character sub-sequence of a document. The w-shingling of a document D[i] may be defined as a set of all possible unique shingles of size w.

More formally, a function $\sigma$ may be defined that takes a document D[i] and a size-value, w, as an input and creates a set of shingles S[i]. For example, this may be represented as $S[i]=\sigma(D[i], w)$. For example, the set of size-5 shingles (where a space is considered a size 1) for a document containing the text "The Sun rises in the east" would be {'The S', 'he Su', 'e Sun', 'Sun', 'Sun r', 'un ri', 'n ris', 'rise', 'rises', 'ises', 'ses i', 'es in', 's in', 'in t', 'in th', 'n the', 'the', 'the e', 'he ea', 'e eas', 'east'}.

Once the shingles are created for each domain of each document, a similarity function may be applied to each possible pair of documents. In other words, each document may be compared to every other document in the KB 106 to obtain an overall similarity score. In one embodiment, the overall similarity score may be based on a sum of similarity scores for each domain of the document. As a result, a more accurate reflection of similarity may be obtained by calculating the similarity score of each domain of each document compared to each domain of another document than calculating a similarity score of the entire document compared to another entire document. For example, a domain of the title of a document, although short, may contribute a larger fraction towards document similarity than when other parts of the document are compared.

In one embodiment, a weighted-average of similarity values obtained from each domain of each document may be used to define document similarity. For example, some domains of the document, such as the title, may be weighted more heavily than other parts of the document when calculating the overall similarity score. Examples of similarity functions that may be used may include a jaccard similarity, a cosine similarity, and the like.

The overall similarity scores are then used to construct a graph (G) of n=|D| nodes. A threshold value of $\tau$ may be used on the overall similarity scores of each document to select edges of the graph. All documents having an overall similarity score $s > \tau$ may possess an edge between them in the graph. Given the graph, a simple breadth-first search (BFS) may be used to compute connected nodes of the graph which correspond to the document clusters C.

This approach has the benefit that it works without the knowledge of a number of clusters, which is usually a required information in almost all other clustering algorithms. An example algorithm for performing the clustering is shown below in Table 1.

TABLE 1

Clustering Algorithm

Algorithm SimCluster (D, C, G, $\theta$, $\sigma$, $\tau$, w)
for i = 1 to n do
   S[i] ← $\sigma$(D[i], w)
for i = 1 to n−1 do TABLE 1-continued Clustering Algorithm

```
        add node i to graph G
        for j = i+1 to n do
            s = θ(S[i], S[j])
            if s > τ then
                add edge (i, j)
    Perform BFS(G) and get k Connected Components
    Each connected component is a cluster C[k] ∈ C
```

The above clustering algorithm takes $O(n^2)$ time, where n is the number of documents in the KB 106.

In one embodiment, the clusters created by the clustering module 118 may be similar topics about a product or service, or procedures related to trouble shooting a product or answers to common questions about a service, and the like.

In one embodiment, the pattern identification module 120 may then identify one or more patterns in each document of each cluster. For example, similar documents within the same cluster may have certain patterns. In one embodiment, the patterns may comprise steps or a sequence of steps. For a cluster C[l] obtained by the clustering module 118, a set of patterns $P \in \{P_1, P_2, \ldots, P_k\}$ may be found such that for each $P_i \in P$, $f(l_{P_i}, f_{P_i}) \geq \alpha$, where $l_{P_i}$ denotes the length of pattern $P_i$, $f_{P_i}$ denotes a frequency of pattern $P_i$ in the cluster C[l], that is, it denotes the number of documents that contain the pattern $P_i$ and the function $f(l_{P_i}, f_{P_i})$ and α threshold parameter a are user defined.

Figure 3:
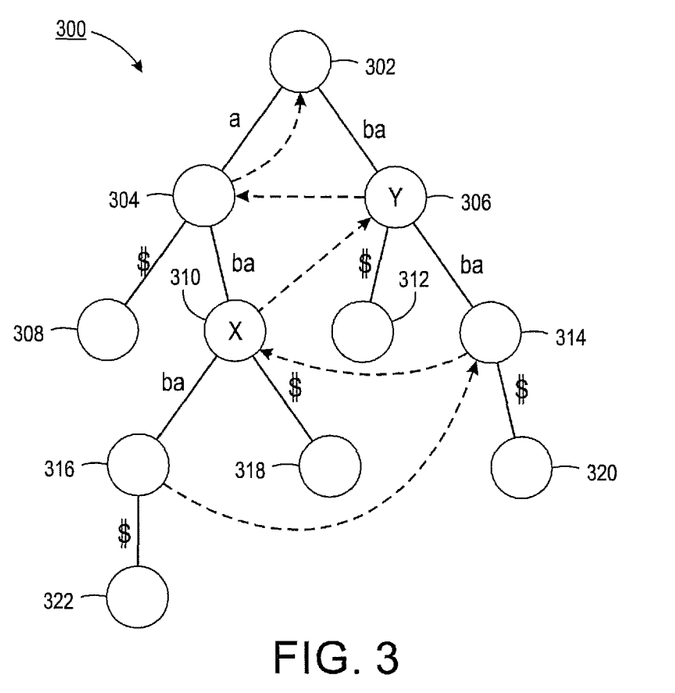
FIG. 3 illustrates an example suffix tree of the present disclosure.

In one embodiment, the pattern identification module 120 may use a suffix tree. An example of a suffix tree 300 is illustrated in FIG. 3. A suffix tree of a pattern $P_i$, may be a tree such that for each suffix S of $P_i$, there is a unique path from a root to a leaf that represents the suffix. Suffix trees can be constructed in linear time and space. In one example let P={ababa}, then the suffix tree of the pattern is shown in the suffix tree 300. The suffix tree may contain a plurality of nodes 302, 304, 306, 308, 310, 312, 314, 316, 318, 320 and 322. The symbol $ may represent an end of a suffix. From the suffix tree 300, it can be seen that there is a unique path for each suffix of $P_i$ in the suffix tree 300. Each path from the root to a leaf represents a suffix of $P_i$. The number of leafs in the suffix tree is augmented by a sequence of letters. On any path from root to leaf, the concatenation of these letters may represent a suffix of $P_i$. Any internal node X (e.g., node 310) in the suffix tree may then represent a prefix of some suffix. For example, node X 310 may represent a pattern β if the concatenation of patterns on the edges from the root to X is β. For example, in FIG. 3, the node X 310 may represent a string "aba" which is the prefix of the suffix "aba" and "ababa."

One feature of the suffix tree 300 may be suffix links illustrated by dashed lines 350, 352, 354, 356 and 358. Consider the node X 310 in the suffix tree 300. Let yβ denote the sequence of letters on the edges from the root node 302 to the node X 310, where y is a single letter and β is a sequence of a character. If there exists a node in the suffix tree 300 that represents β, then there is a suffix link (e.g., dashed line 354) from the node X 310 to that node. For example, in FIG. 3, there is a suffix link 354 from the node X 310 to the node Y 306 because the node X 310 represents "aba" and the node Y 306 represents "ab." These suffix links are used by the pattern identification module 120 to improve computational efficiency in finding the set of patterns $P \in \{P_1, P_2, \ldots, P_k\}$.

Thus, in one embodiment, the pattern identification module 120 may use the suffix trees (e.g., similar to the suffix tree 300) to find similar patterns from the cluster C[k]. In one embodiment, all of the documents in a cluster are concatenated into a single document D. Then a suffix tree is built over D. For each internal node X in the suffix tree, the following information is augmented:

1. Let R(X) denote the sequence represented by X. The length of R(X) will be stored |R(X)| at node X.
2. The number of documents in the cluster C[k] that have R(X) as its substring are found. This information is also augmented at the node X. This count may be denoted as $c_X$.

In one embodiment, finding |R(X)| for all internal node X requires a BFS (described above) in the suffix tree. The time taken to perform a BFS may take time which is linear in the number of nodes and edges in the suffix tree. The number of edges in the suffix tree is |D|. So finding |R(X)| may take time which is linear to the size of the document.

However, to reduce the amount of time in finding |R(X)|, the suffix links of the suffix tree (as described above with reference to FIG. 3) may be used. Initially, all of the nodes are inactive with respect to the document D[j]. A node in the suffix tree that represents all the sequence of words in the document D[j] is found. Once such a node, for example a node X, is found, then the suffix tree is traversed from the node X to the root until an active node is encountered. For all the inactive nodes from the node X, the count is increased at these nodes by 1. Note that all the intermediate nodes represent some substring of D[j] and the algorithm correctly increases the count of these nodes. Then the suffix link of the node X is used to move to the next node. Assume that D[j]=yβ, then the node X represents yβ, where y is a single letter and β is a sequence of letters. The other endpoint of the suffix link of the node X, for example a node X', may then represent β. Now the same operation is performed on the node X'. That is, the suffix tree is traversed from the node X to the root until an active node is reached and the count is increased at all the intermediate nodes. Using, the count algorithm in Table 2 below the $c_X$ can be correctly calculated.

TABLE 2

Count Algorithm

```
Find the node X that represents the string D[j]
while true do
    if X is a root and inactive then
        c_X ← c_X + 1;
        return;
    else if X is a root then
        return;
    Y ← X
    While Y is inactive do
        c_Y ← c_Y + 1;
        activate Y;
        Y ← parent of Y;
    X ← the other endpoint from the suffix link of X
```

Regarding the running time, note that the number of times the suffix link is traversed for document D[j] is |Dj|. Also, from the path from the node X to the root, a node is traversed only if it is inactive with respect to D[j]. Since the number of leaf nodes corresponding to D[j] is exactly |D[j]|, the number of internal nodes that are traversed is O(|D|j|). Since each node is traversed just once, the total time taken for the document D|j| is O(|D|j||). So for all the documents the total time taken may be $\Sigma_{D[j] \in C[k]} O(|D|j||) = O(|D|)$.

Once the suffix tree has been augmented, then similar patterns may be found in the cluster using the suffix tree. For each node X, $f(|R(X)|, c_X)$ may be calculated, where $f(|R(X)|, c_X)$ is some user defined function. In addition, a heap H may be built based on the values of the function $f$ of each node X.

The common patterns may be found based on the user defined function $f$. Assume that all the nodes are first set to be active before the start of this procedure. First, the root node in H is taken. This implies that based on the user defined function $f$ that the pattern R(X) is a sequence that is common across many documents in the cluster. Then, P is added to the pattern R(X). Since the pattern P is added, all patterns in the suffix tree that overlap with the pattern R(X) are removed. The patterns may be removed by removing the node X and all the nodes from the subtree rooted at the node X. All of these nodes are also removed from the heap H. All the nodes in the subtree rooted at the node X have R(X) as its prefix. Since R(X) is already in P, these strings represented by these nodes cannot be added to P. Also, for the parent of the node X, for example the node Y, the new $c_Y$ may be calculated due to the fact that the node X along with the subtree is removed from the suffix tree. Since the node Y is the parent of the node X, R(Y) is the prefix of R(X). So all the documents that contain R(X) also contain R(Y). Since X is removed from the suffix tree, we subtract $c_X$ from $c_Y$. This is done for all nodes from the node X to the root node of the suffix tree. Also, the heap H is updated to reflect the change in the count values of the updated nodes.

Let R(X)=yβ and follow the suffix link of the node X. Let Y be the other endpoint of the suffix link. Since the node Y was reached from the suffix link of the node X, R(Y)=β may be the suffix of R(X). As a result, all the documents that contain R(X) may also contain R(Y). Since the node X is removed from the suffix tree, $c_X$ is subtracted from $c_Y$. The above process may be repeated for all of the nodes of the suffix tree that are rooted at the node Y and also to all the nodes from the node Y to the root. The heap may be updated to reflect the change in the count values of the updated nodes. The above process then is repeated until there are no nodes in the heap or the root of the heap has the function $f$ value greather than some user-defined threshold α.

The above process may be implemented using the pattern identification algorithm in Table 3 to find the patterns in the suffix tree.

TABLE 3

Pattern Identification Algorithm

Build a max heap H
while true do
  if H is empty then
    return;
  X ← remove the root of H
  If $f(|R(X)|, c_X)$ < α then
    return;
  Add R(X) to P
  for each node Y of the tree rooted at X do
    Remove Y from suffix tree
    Remove Y from H
  for each node Y from X to the root of the suffix tree do
    $c_Y$ ← $c_Y$ + 1;
    Update Y in the heap H;
  while Y is not the root of the suffix tree do
    for each node Y' of the tree rooted at Y do
      $c_Y$ ← $c_Y$ + 1
      Update Y' in the heap H
    for each node Y' from Y to the root of the suffix tree do
      $c_Y$ ← $c_Y$ + 1
      Update Y' in the heap H
    Y ← node traversed from the suffix link of Y The run time of the pattern identification module 120 to perform the pattern identification may be O(|D|) since there are only |D| nodes in the suffix tree. The total worst case running time of the pattern identification process for |P| total number of patterns may be O(|P||D|).

In one embodiment, the aggregation module 122 may then aggregate the patterns identified in each cluster of documents into a trie data-structure that is in machine readable form. The trie data-structure may be used by the KBPS 104 to automatically provide a solution to customer care requests. The trie data-structure also provides a finer grained control over solution navigation by the KBPS 104.

The aggregation may be performed by merging steps together that are the same or highly similar (e.g., using a similarity described above with respect to the clustering module 118 and having a similarity score above a threshold τ). For example, two steps in a document "Tap Done when finished" and "Tap Save when finished" can be merged under a notion of low edit-distance thresholds. As discussed above, each word in the document can be tokenized into unique tokens. Thus, the two steps may be represented in an example as "ABCD" and "AECD." Using an example edit-distance threshold of 1, a match can be produced.

In addition, to merging similar steps, a position of each step in a sequence of steps of the patterns are considered. The merging of steps should satisfy a common-prefix property as two steps cannot be merged if one of them is a first step while the other is a last step, for example.

Figure 4:
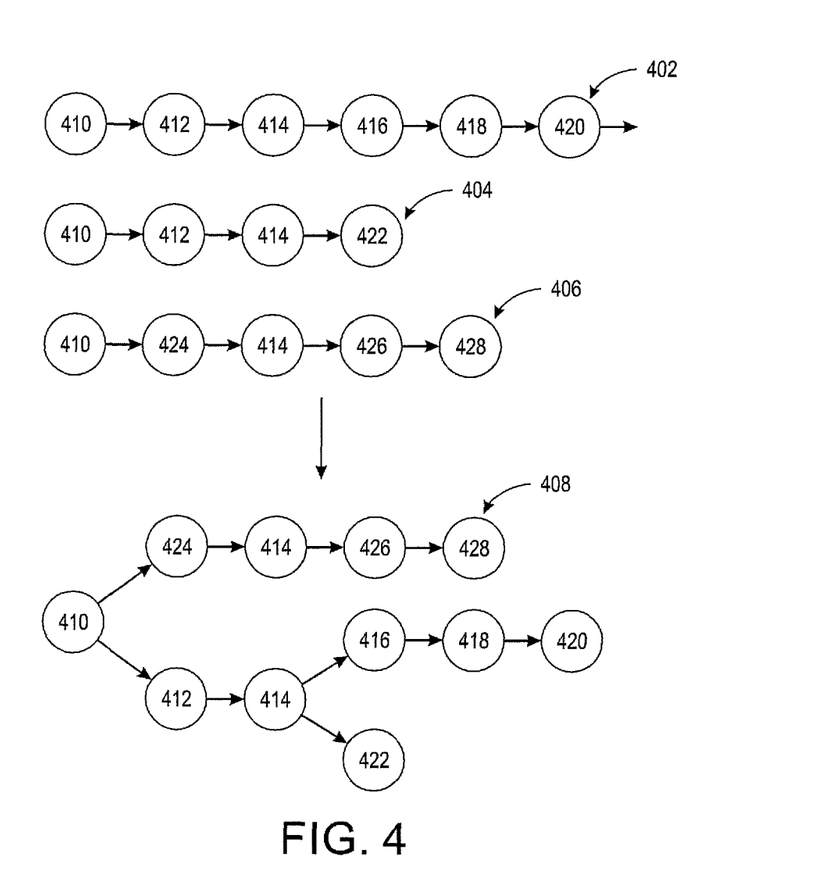
FIG. 4 illustrates an example trie data structure used by the application server for the automated system.

FIG. 4 illustrates an example of how the steps of the identified patterns are merged to form a trie data-structure. For example, a pattern of tokens 402, 404 and 406 may have been identified to form a cluster of documents by the pattern identification module 120. The pattern of tokens 402 may include steps 410, 412, 414, 416, 418 and 420. The pattern of tokens 404 may include steps 410, 412, 414 and 422. The pattern of tokens 406 may include steps 410, 424, 414, 426 and 428.

Using the objectives for aggregation described above, the aggregation module 122 may merge the pattern of tokens 402, 404 and 406 into a single machine readable trie data-structure 408. For example, the step 410 may be common to all three pattern of tokens 402, 404 and 406 and occur at the same position. As a result, step 410 may be merged into a single step in the machine readable trie data-structure 408. Similarly, the step 412 may occur in both the pattern of tokens 402 and 404 and at the same position. As a result, the step 412 may be merged into a single step in the machine readable trie data-structure 408. However, step 424 in the pattern of tokens 406 is not common to the other steps of the pattern of tokens 402 and 404 at the same position. As a result, step 424 is branched off of step 410 in parallel to the step 412 in the machine readable trie data-structure 408. The remaining steps may be merged and aggregated similarly to form the machine readable trie data-structure 408.

The KBPS 104 may then use the machine readable trie data-structure 408 to help automatically find a solution to a customer care request. The KBPS 104 may also have finer grain control over navigating a solution using the trie data-structure 408 than previously deployed methods. For example, previously, an automated system may simply read one document after another. Many documents having common steps then would be repeated. In addition, the automated system may start from the beginning of each document if a solution was not found in the previous documents that were read.

In contrast, the machine readable trie data-structure 408 allows the KBPS 104 to move one step at a time along the trie data-structure 408. For example, a customer care request may be received for troubleshooting a mobile phone. The KBPS 104 may find the trie data-structure 408 that is related to a cluster of documents that was associated with troubleshooting a mobile phone. For example, a plurality of different trie data-structures 408 may be aggregated for each cluster of documents. The KBPS 104 may determine the type of problem associated with the customer care request and search the plurality of different trie data-structures to find the trie data-structure from a cluster of documents that is associated with the same type of problem associated with the customer care request. Using the trie data-structure 408 as an example, the steps 410-428 may have been patterns that were identified in the cluster of documents associated with troubleshooting a mobile phone and the steps 410-428 may have been aggregated into the trie data-structure 408.

The KBPS 104 may begin at step 410 and proceed to step 412, then step 414, then step 416, then step 418 and then step 420. However, if the sequence of steps does not lead to a solution, then the KBPS 104 may return to step 414 to try an alternate solution at step 422. Notably, the KBPS 104 does not need to return to the beginning at step 410 each time a path of the trie data-structure 408 fails.

In one embodiment, the customer interaction module 124 may receive and process a customer care request. In one embodiment, the customer interaction module 124 may include an interactive voice response (IVR) system to process natural language customer care requests or text from a message during an online chatting session that contains the customer care request. The customer interaction module 124 may communicate with the customer and provide an automated solution to the customer care request by finding the appropriate trie data-structure 408 and navigating through the trie data-structure 408 to provide a solution to the customer care request. Thus, the embodiments of the present disclosure provide a more efficient method to cluster, identify patterns and aggregate the patterns into a machine readable trie data-structure, which then allows for more efficient automated customer care.

Figure 5:
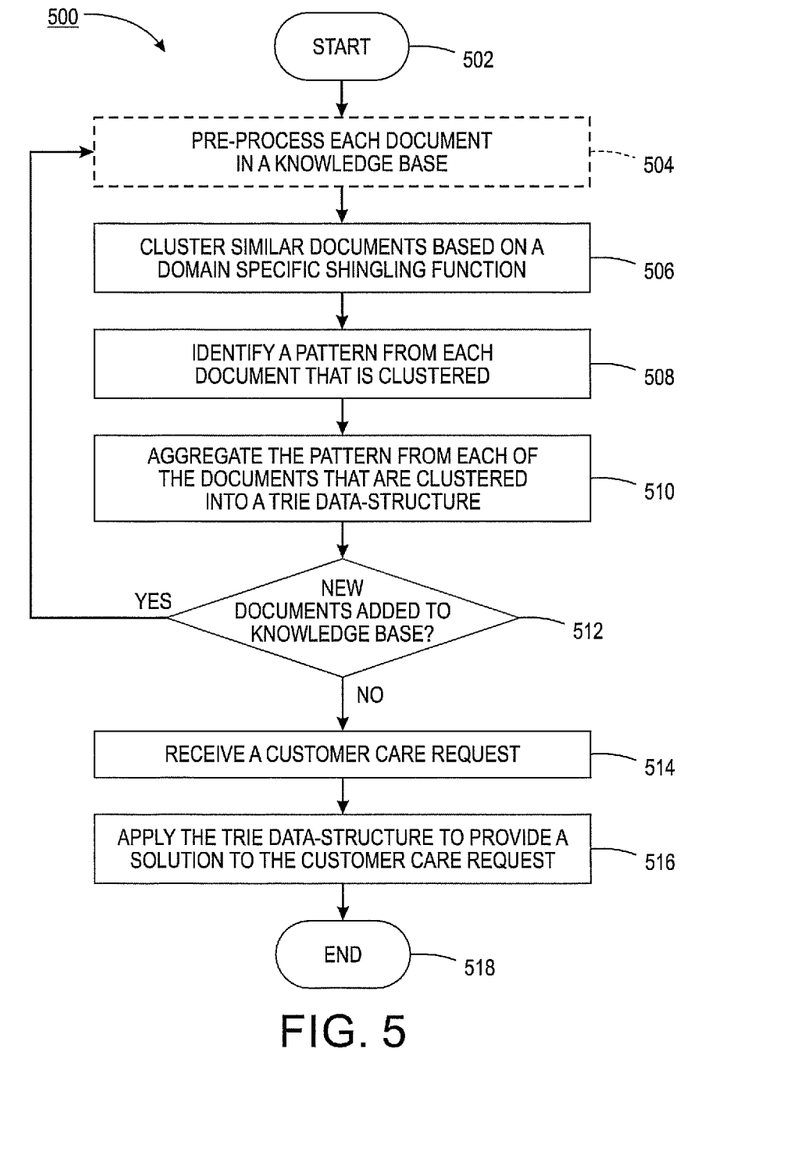
FIG. 5 illustrates an example flowchart of a method for transforming a knowledge base into a machine readable format for an automated system.

FIG. 5 illustrates a flowchart of a method 500 for transforming a knowledge base into a machine readable format for an automated system. In one embodiment, one or more steps, or operations, of the method 500 may be performed by the KBPS 104.

At block 502 the method 500 begins. At optional block 504, the method 500 pre-processes each document in a knowledge base. For example, the documents may be pre-processed to extract metadata from each one of the documents. In one embodiment, the metadata may be HTML tags that identify different domains (e.g., different sections such as a title and a body) of the associated document.

At block 506, the method 500 clusters similar documents based on a domain specific shingling function. In one embodiment, the domain specific shingling function may be performed by the clustering module of the KBPS as described above.

For example, the domain specific shingling function may include identifying a plurality of different domains in each one of the plurality of documents based on the metadata. Then a similarity score may be calculated for each one of the plurality of different domains of a document and a corresponding domain of each remaining document of the plurality of documents. Then an overall similarity score may be calculated based on the similarity score for each one of the plurality of different domains for the document to each remaining document of the plurality of documents. In one embodiment, the similarity scores for each domain may be weighted. Then the documents that have an overall similarity score above a threshold may be clustered.

At block 508, the method 500 identifies a pattern from each document that is clustered. In one embodiment, the pattern may be identified by the pattern identification module of the KBPS as described above.

For example, a suffix tree may be built for each one of the plurality of documents that are clustered. A plurality of different patterns may be extracted from the suffix tree for each one of the plurality of documents that are clustered. A pattern may be identified from the plurality of patterns that occurs above a predefined number of documents of the plurality of documents that are clustered. To improve the efficiency, a suffix link may be used when traversing the suffix tree.

At block 510, the method 500 aggregates the pattern from each of the documents that are clustered into a trie data-structure. In one embodiment, the pattern from each of the documents may be aggregated by the aggregation module of the KBPS as described above. For example, the aggregating may include combining a plurality of patterns into a single pattern that is represented by the trie data-structure.

At block 512, the method 500 determines if new documents are added to the knowledge base. If new documents are added, the method 500 may return to optional block 504 and blocks 504 to 512 may be repeated. If no new documents are added to the knowledge base, the method 500 may proceed to block 514.

At block 514, the method 500 receives a request. In one embodiment, the request may be a customer care request. For example, a customer may call or chat, via an online chat session, a customer care center with the customer care request. The customer may have a problem, may be trying to troubleshoot the problem or may have a question about a product or service. However, it should be noted that the request may be associated with any type of automated system that requires an automated response based upon the knowledge based that is automatically organized and transformed into a machine readable form by the KBPS.

At block 516, the method 500 applies the trie data-structure to provide a solution to the request. For example, the KBPS may search all available trie data-structures of each cluster of documents to find a trie data-structure that is associated with a cluster that matches a topic associated with the request. The KBPS may then navigate the trie data-structure to provide the solution to the request. At block 518 the method 500 ends.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 5 that recite a determining operation, or involve a decision, do not necessarily require that both branches of the determining operation be practiced. In other words, one of the branches of the determining operation can be deemed as an optional step.

As a result, the embodiments of the present disclosure provide a specialized KBPS that can transform documents in the knowledge base. In one embodiment, the KBPS may use a novel combination of domain based shingling to cluster documents, suffix tree links to identify patterns in each document of a cluster and aggregate a plurality of patterns into a trie data-structure that can be used by the KBPS for automated customer care. Furthermore, the KBPS can transform unorganized documents into a single machine readable data structure that is used to provide automated solutions to the customer care requests.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for transforming a knowledge base into a machine readable format, comprising:
    clustering, by a processor of a knowledge base processing server, two or more documents of a plurality of documents in the knowledge base that are similar based upon a domain specific shingling function;
    identifying, by the processor, a pattern from each document of the plurality of documents that are clustered, wherein the pattern comprises a sequence of steps;
    aggregating, by the processor, the pattern of the each document of the plurality of documents that are clustered into a trie data-structure that is machine readable;
    receiving, by the processor, a request; and
    applying, by the processor, the trie data-structure to provide a solution to the request.

2. The method of claim 1, further comprising:
    pre-processing, by the processor, the plurality of documents to extract metadata.

3. The method of claim 2, wherein the domain specific shingling function comprises identifying a plurality of different domains in each one of the plurality of documents based on the metadata.

4. The method of claim 3, wherein the clustering comprises:
    calculating, by the processor, a similarity score for each one of the plurality of different domains of a document to a corresponding domain of each remaining document of the plurality of documents;
    calculating, by the processor, an overall similarity score based on the similarity score for the each one of the plurality of different domains for the document to the each remaining document of the plurality of documents; and
    clustering, by the processor, the document and one or more of the each remaining document of the plurality of documents when the overall similarity score is above a threshold.

5. The method of claim 1, wherein the identifying the pattern, comprises:
    building, by the processor, a suffix tree for each one of the plurality of documents that are clustered;
    extracting, by the processor, each pattern of a plurality of patterns from the suffix tree for the each one of the plurality of documents that are clustered; and
    identifying, by the processor, the pattern from the plurality of patterns that occurs above a predefined number of documents of the plurality of documents that are clustered.

6. The method of claim 5, wherein the extracting each pattern of the plurality of patterns comprises using a suffix link when traversing the suffix tree.

7. The method of claim 1, wherein the aggregating comprises:
    combining, by the processor, a plurality of patterns into a single pattern represented by the trie data-structure.

8. The method of claim 1, wherein the clustering, the identifying and the aggregating are repeated periodically to account for new documents added to the knowledge base.

9. The method of claim 1, wherein the applying the trie data-structure to provide the solution to the request comprises navigating the trie data-structure node by node until the solution is provided.

10. An apparatus, comprising:
    a processor; and
    a computer readable medium in communication with the processor, the computer readable medium comprising:
        a clustering module to cluster two or more documents of a plurality of documents in a knowledge base that are similar based upon a domain specific shingling function;
        a pattern identification module to identify a pattern from each document of the plurality of documents that are clustered, wherein the pattern comprises a sequence of steps;
        an aggregation module to aggregate the pattern of the each document of the plurality of documents that are clustered into a trie data-structure that is machine readable; and
        a customer interaction module to receive a request and apply the trie data-structure to provide a solution to the request.

11. The apparatus of claim 10, wherein the processor is in communication with the knowledge base to obtain the plurality of documents.

12. The apparatus of claim 10, wherein the domain specific shingling function comprises identifying a plurality of different domains in each one of the plurality of documents based on metadata extracted from the each one of the plurality of documents.

13. The apparatus of claim 12, wherein the clustering module is further configured to:
    calculate a similarity score for each one of the plurality of different domains of a document to a corresponding domain of each remaining document of the plurality of documents;
    calculate an overall similarity score based on the similarity score for the each one of the plurality of different domains for the document to the each remaining document of the plurality of documents; and
    cluster the document and one or more of the each remaining document of the plurality of documents when the overall similarity score is above a threshold.

14. The apparatus of claim 10, wherein the pattern identification module is further configured to:
    build a suffix tree for each one of the plurality of documents that are clustered;
    extract each pattern of a plurality of patterns from the suffix tree for the each one of the plurality of documents that are clustered; and
    identify the pattern from the plurality of patterns that occurs above a predefined number of documents of the plurality of documents that are clustered.

15. The apparatus of claim 14, wherein the pattern identification module extracts each pattern of the plurality of patterns using a suffix link when traversing the suffix tree.

16. The apparatus of claim 10, wherein the aggregation module is further configured to:

combine a plurality of patterns into a single pattern represented by the trie data-structure.

17. The apparatus of claim 10, the cluster module, the pattern identification module and the aggregation module may be periodically activated to account for new documents added to the knowledge base.

18. The apparatus of claim 10, wherein the customer interaction module applies the trie data-structure to provide the solution to the request by navigating the trie data-structure node by node until the solution is provided.

19. A method for transforming a knowledge base into a machine readable format, comprising:

extracting, by a processor of a knowledge base processing server, HTML tags for each document of a plurality of documents in the knowledge base, wherein the HTML tags define a plurality of domains for each one of the plurality of documents;

calculating, by the processor, an overall similarity score for each pair of documents of the plurality of documents based on a similarity score of each one of the plurality of domains of the each pair of documents;

clustering, by the processor, two or more documents of the plurality of documents into a cluster of documents that have the overall similarity score above a threshold value;

identifying, by the processor, a plurality of patterns comprising a pattern from each document of the cluster of documents using suffix links of a suffix tree associated with the each document of the cluster of documents, wherein the pattern comprises a sequence of steps;

aggregating, by the processor, the plurality of patterns into a trie data-structure that is machine readable;

receiving, by the processor, a customer care request; and applying, by the processor, the trie data-structure to provide a solution to the customer care request.

20. The method of claim 19, wherein the extracting, the calculating, the clustering, the identifying and the aggregating are repeated periodically to account for new documents added to the knowledge base.

\* \* \* \* \*